Aug. 21, 1962 L. S. GUARINO ETAL 3,050,710
COMMAND LIMITER
Filed July 2, 1959 3 Sheets-Sheet 1

INVENTORS
HORACE B. WELK, JR.
LOUIS S. GUARINO
BY
AGENT

Aug. 21, 1962    L. S. GUARINO ETAL    3,050,710
COMMAND LIMITER
Filed July 2, 1959    3 Sheets-Sheet 2

Fig. 3

United States Patent Office 3,050,710
Patented Aug. 21, 1962

3,050,710
COMMAND LIMITER
Louis S. Guarino, Hatboro, and Horace B. Welk, Jr., Churchville, Pa., assignors to the United States of America as represented by the Secretary of the Navy
Filed July 2, 1959, Ser. No. 824,749
14 Claims. (Cl. 340—27)
(Granted under Title 35, U.S. Code (1952), sec. 266)

The invention described herein may be manufactured and used by or for the Government of the United States of America for governmental purposes without the payment of any royalties thereon or therefor.

The present invention relates to aircraft instrumentation and more particularly relates to a command limiter.

One of the foremost problems confronting the aircraft industry is the problem of improving the compatibility of an aircraft's controls and a pilot's capabilities. It is accepted that the pilot is the weakest link in the man-machine-mission concept used in the development of better aircraft instrumentation for the more efficient utilization of aircraft designed for a particular mission.

It is, therefore, desirable to reduce a pilot's mental and physical effort by providing simplified, processed information on flight directors and command displays. Accordingly, the principles of unburdening, quickening and command translation are applied in the present invention for achieving the above goal.

Unburdening is defined as the process of easing the human's task by reducing the required effort, i.e., the necessity of applying a force continuously or in some time-sequence pattern.

Quickening comprises feeding back to a pilot information, usually in a visual display, concerning the effects of the pilot's actions on the dynamic situation of the controlled machine.

Whether a pilot is unburdened in the control of a machine depends upon the desired output as well as upon the machine's characteristics. In the case of an aircraft, the pilot is unburdened for heading and altitude changes.

Quickening aids the pilot by improving his stimulus-response integrity and contributes to the stabilization of the pilot-aircraft dynamic system.

Accordingly, it is contemplated that with the present invention, the pilot need only perform as an analog amplifier instead of an integrator; and the response of the pilot-aircraft system will be made substantially independent in the invention of changes in airspeed and altitude by automatic gain compensation. Furthermore, the response of the aircraft can be varied by adjustment of feedback and error-display indicator gains.

For example, to change heading or altitude, the pilot must control a double integration. This the pilot does by anticipating the aircraft's response when the control stick is positioned. The integration imposed by the aircraft unburdens the pilot but results in a condition of low stimulus-response integrity. To improve the situation, quickening is utilized. This, in accordance with the invention, comprises the feeding back, to a visual display, of a signal indicative of the aircraft's dynamic condition. Now, the pilot need only function as an analog amplifier but the aircraft will lag behind the command. The lag is reduced by command translation which is accomplished in the invention by moving the command ahead before it is impressed on the command display.

One of the principal objects of the invention, therefore, is the provision of novel aircraft instrumentation which will instantaneously indicate if the aircraft is being operated in such a manner that a commanded maneuver of the aircraft is being carried out.

Another object of the invention is the provision of an apparatus including a visual display for an aircraft, the apparatus being referred to as a command limiter, for monitoring the dynamic situation of the aircraft, i.e., the actual commands to the aircraft and the speed of the aircraft, and comparing this data with commands, such as course direction, climbing, diving, altitude, etc., inserted into the command limiter by the pilot and indicating to the pilot via the visual display what corrections must be made in the operation of the aircraft so that the inserted commands will be carried out.

Yet another object of the invention is the provision of a command limiter for immediately indicating to a pilot the proper control stick position for carrying out the specific commands manually inserted into the command limiter by the pilot. This is accomplished by permitting the pilot to quickly observe the effect of control stick positioning and permit the pilot to immediately ascertain what further positioning of the control stick will be required to carry out the command.

A still further object of the invention is the provision of a command limiter, as set forth in the preceding object, capable of having a command altitude and a command vertical speed inserted therein and having means for monitoring the actual vertical speed of the aircraft and the control stick position, means for comparing the actual performance of the aircraft with the commands thereto, and visual display means for indicating to the pilot whether or not the aircraft is being controlled in a manner necessary to carry out the inserted commands.

Yet another object of the invention is the provision of a command limiter provided with means for computing the allowable load limit of an aircraft according to the dynamic situation of the aircraft from a V-$n$ (velocity-normal acceleration) envelope thereof and automatically adjusting the command to the command limiter so that the pilot will not be commanded to operate the aircraft in such a manner as to cause the computed allowable load limit to be exceeded.

A still further object of the invention is the provision of a command limiter provided with means for automatically limiting a command thereto so that the computed allowable load limit of the aircraft will not be exceeded.

Another object of the invention is the provision of a command limiter provided with means for automatically limiting a command thereto in such a manner that the aircraft may be flown to a command altitude along an asymptotic path when within a predetermined distance of the command altitude.

Another object of the invention is the provision of a command limiter having means for permitting a hold altitude command to be made thereto so that a pilot may fly the aircraft at the selected altitude by merely keeping a needle centered in a visual display.

Another object of the invention is the provision of a command limiter having means for permitting a course heading command to be made thereto so that a pilot may fly the aircraft to the course heading and hold the heading by merely keeping a needle centered in a visual display.

Another object of the invention is the provision of a command limiter provided with means for permitting a dive and/or climb command to be made thereto so that a pilot may dive or climp the aircraft at a commanded vertical speed, without fear of exceeding the structural limits of the aircraft, by merely keeping a needle centered in a visual display.

Another object of the invention is the provision of a means for warning a pilot of an aircraft having a command limiter when a command to the command limiter is being modified by an allowable load limit computer so that the maximum allowable load limit of the aircraft will not be exceeded.

Another object of the invention is the provision of a novel aircraft instrument which will indicate if a selected altitude is being approached asymptotically, at a preselected rate of altitude change, and/or at a rate not exceeding the critical load limit of the aircraft.

A still further object of the invention is the provision of an aircraft instrument which will immediately command a pilot to bank an aircraft so as to execute a turn to a commanded heading, at the current Mach number, in such a manner as to not cause the critical load limit of the aircraft to be exceeded.

Another object of the invention is the provision of apparatus adapted to operate as a monitor of the commands to an aircraft in the vertical and/or horizontal flight track and means for automatically comparing the commands to the aircraft with the computed maximum allowable load limit of the aircraft.

The invention further resides in certain novel features of construction, combinations and arrangements of parts, and further objects and advantages of the invention will be apparent to those skilled in the art to which it pertains from the following description of the present preferred embodiment thereof described with reference to the accompanying drawings, which form a part of this specification, and wherein the same reference characters represent corresponding parts throughout the several views, and in which:

It is understood that the invention is not limited to the details of construction and arrangement of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Figure 1:
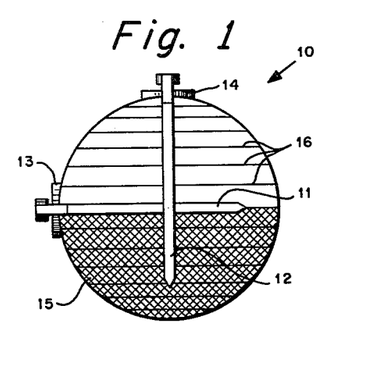
FIG. 1 is a front elevational view of an aircraft indicator instrument suitable for use as a visual display in connection with the present invention.
Figure 2:
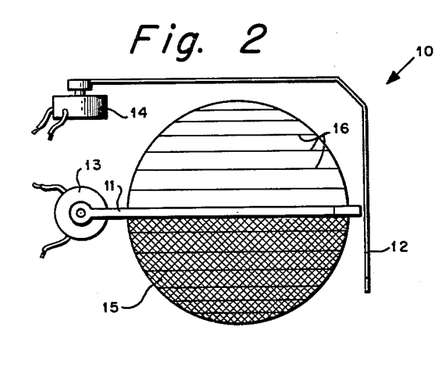
FIG. 2 is a side elevational view of FIG. 1.

Referring to FIGS. 1 and 2, a suitable aircraft instrument, indicated generally by the reference numeral 10, forms the visual display and comprises a vertically movable horizontal indicator needle 11 and a horizontally or laterally movable vertical indicator needle 12. The needles 11 and 12 are ammeter needles operated by conventional delicate galvanometer-type ammeter units 13 and 14, respectively, which receive signals from the apparatus of FIGS. 3, 4 and 5, in a manner to be described. The indicator needles 11, 12 are adapted to be centered relative to an equator of a sphere 15 which has, in addition to the equator line, parallel circular markings 16 spaced ten degrees latitude apart. The equator of the sphere 15 represents the horizon.

Figure 3:
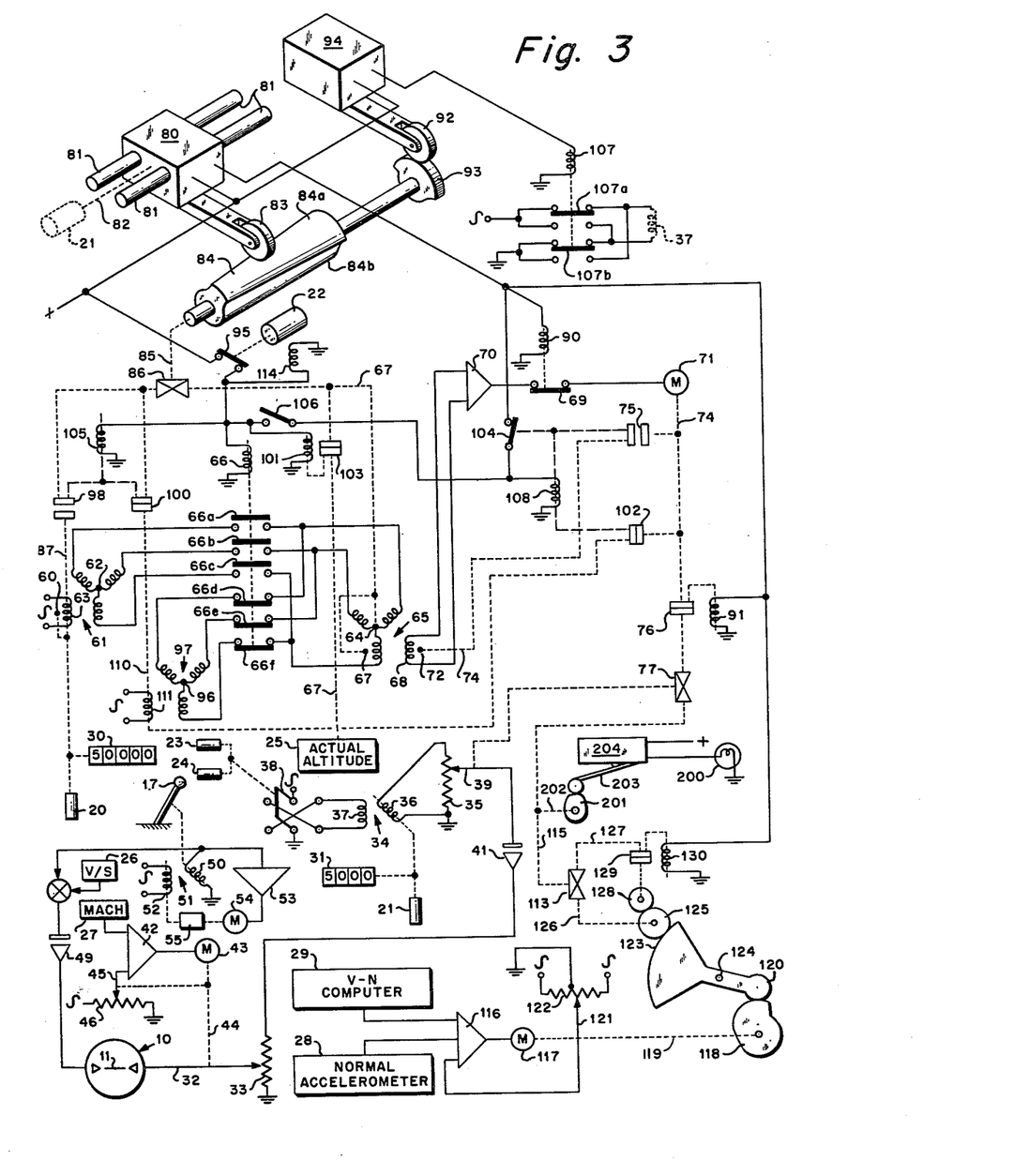
FIG. 3 is a schematic electromechanical diagram of a vertical flight track portion of the invention.

The operator of the aircraft attempts to keep the indicators 11, 12 centered at all times. If the horizontal indicator 11 moves upwardly, it means that a control stick 17, FIGS. 2 and 3, is pulled back too far or at least if the position of the stick 17 is maintained at its present position, the command will not be carried out.

Should the needle 11 move below the center of the sphere 15, it means that the aircraft, if the instant position of the control stick 17 is maintained, will be or is being operated at an attitude so as to take the aircraft below the command altitude.

Similarly, the vertical needle 12 will indicate, by moving to the right or left of a center, if the control stick 17 position is such that it will cause the aircraft to be excessively banked respectively to the right or the left when the aircraft is being maneuvered to a command course heading.

Accordingly, the indictor instrument 10 provides a quickened display to the operator of the aircraft and indicates if the position of the aircraft control stick 17 will result in the aircraft being flown in such a manner that the commanded operation will be or is being carried out. If the indicator indicates that the command is not being carried out, it will indicate what must be done to operate the aircraft in accordance with the command.

*Vertical Flight Track*

Figure 4:
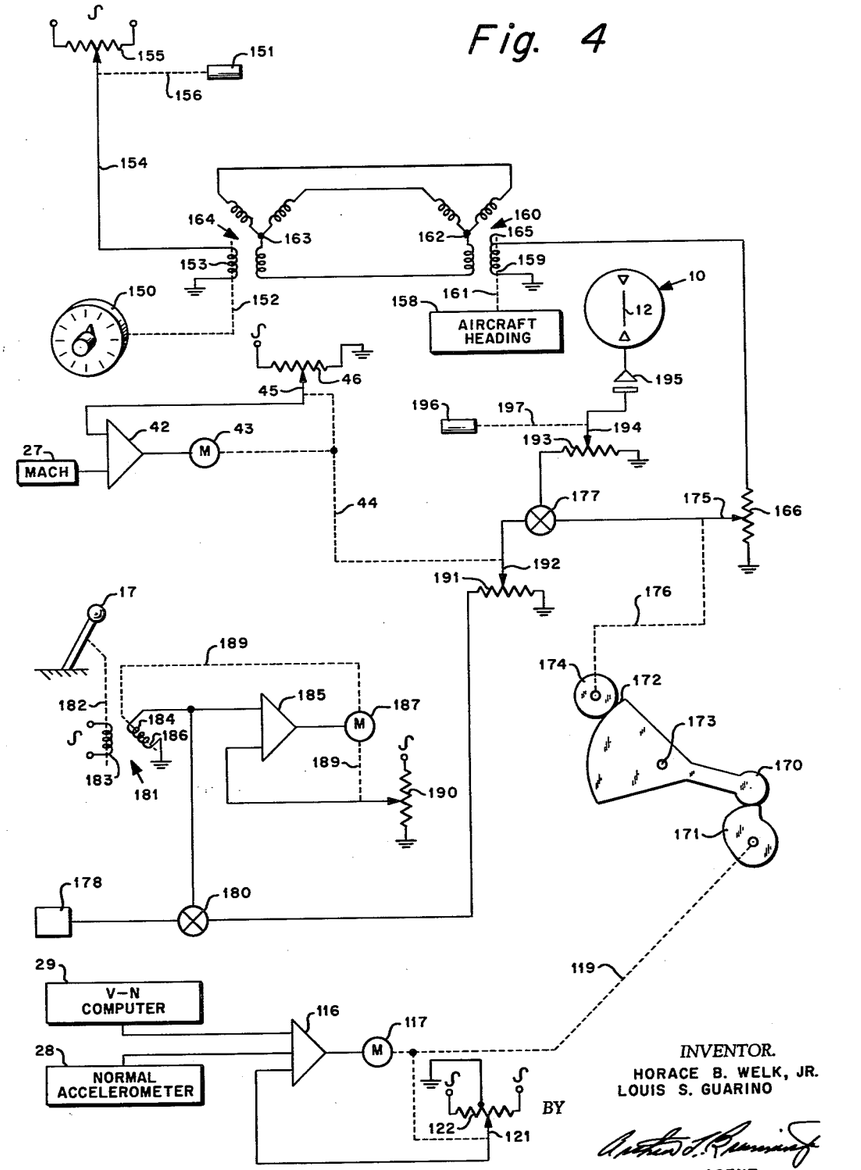
FIG. 4 is a schematic electromechanical diagram of a horizontal track portion of the invention.
Figure 5:
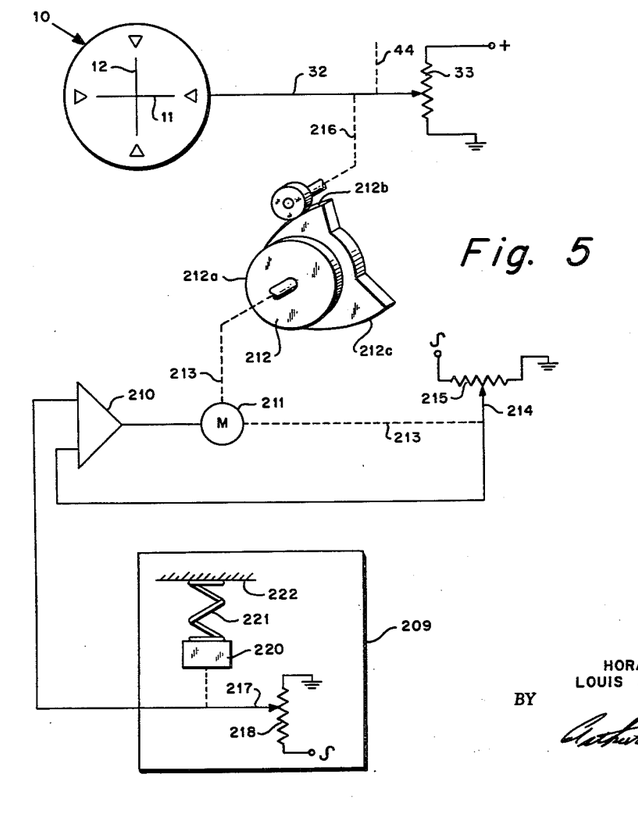
FIG. 5 is a schematic electromechanical diagram of a part of the invention for introducing the upper and lower normal acceleration limits into the invention.

An embodiment of the invention is shown in FIGS. 3, 4 and 5, and each figure illustrates a phase of the invention. FIGS. 3 and 5, respectively, show the apparatus which receives, analyzes, computes, and/or compares the commands inserted into the apparatus with the position of the control stick 17 and the airspeed of the aircraft in the vertical and horizontal flight tracks thereof and then causes the vertically swingable indicator 11 (FIGS. 1 and 2) to show whether the control stick 17 is properly positioned to carry out the command inserted into the apparatus of FIG. 3. However, if the command given or inserted into the apparatus of FIG. 3 is not within the capability of the aircraft, the command will be automatically modified to come within the aircraft's capability. In other words, the aircraft will not be permitted to climb, dive, bank and/or turn quite so sharply or fast and thereby prevent possible structural overstresses or failures so long as the indicators 11, 12 are kept centered.

Referring to FIG. 3, a plurality of manual controls for various commands are available. The controls comprise an altitude command knob 20, a vertical speed command knob 21, an altitude hold button 22, a climb button 23, and a dive button 24. The automatic inputs to the apparatus of FIG. 3 comprise an actual altitude input 25 from a conventional apparatus, not shown, an actual vertical speed input 26 from a conventional apparatus, not shown, a Mach number input 27 from a conventional apparatus, not shown, an actual normal acceleration input from a normal accelerometer 28, and a V-$n$ (velocity-normal acceleration) computer input 29. All of the inputs 26 through 29 are in the form of electrical voltage signals proportional to the values of the respective variable parameters. Both the V-$n$ computer 29 and the normal accelerometer 28 are preferably similar to those shown and described in a joint invention of Cyrus Beck and Louis S. Guarino, application Serial No. 824,750 filed July 2, 1959 entitled, "Allowable Load Limit Computer and Indicator." For purpose of simplicity, the V-$n$ computer in the copending application will be utilized; and accordingly the same aircraft will be used solely for purpose of describing and illustrating a preferred form and best mode of the invention.

For example, should the operator desire to climb the aircraft to an altitude of 50,000 feet at a rate of 5000 feet per minute, the altitude command knob 20 is adjusted until an indicator 30 reads 50,000 feet as shown in FIG. 3, the vertical speed command knob 21 is adjusted until an indicator 31 reads 5000 f.p.m., and the climb button 23 is pressed. This will cause a voltage to be fed to the right hand side of the cross pointer indicator 10 of FIG. 3 via a wiper 32 of a grounded Mach monitor potentiometer 33 proportional to the command and cause the horizontal indicator 11 to move downwardly away from center.

Accordingly, the operator will pull back on the stick 17 until a voltage of opposite phase is fed into the left hand side of the indicator 10, FIG. 3, equal to the voltage input from the wiper 32, thereby centering the needle 11.

Specifically, operation of the vertical speed knob 21 positions a secondary 36 of a grounded command linear transformer 34 so that a full voltage proportional to the command vertical speed is impressed on a command potentiometer 35. The command voltage is induced into a grounded secondary winding 36 of the command transformer 34 from a grounded primary winding 37. The transformer primary 37 is energized from a standard electrical power supply when a polarity reversing switch 38 is closed by pressing either the climb button 23 or the dive button 24 and reversing the exciting voltage in the transformer 34.

A wiper 39 of the potentiometer 35 is spring-positioned so that the full voltage from the command linear transformer 34 forms the output unless the wiper 39 is repositioned because of V-$n$ limiting or altitude washout when the aircraft is within 1000 to 5000 feet of the commanded altitude, as will be described later.

The wiper voltage, via a demodulator 41, is impressed across the winding of the Mach monitor potentiometer 33. A servomechanism, supplied with a voltage signal from a Mach input 27, positions the wiper 32 of the potentiometer 33 as a function of the aircraft Mach number. The servomechanism comprises an amplifier 42 and is adapted to drive a motor 43 which then positions the wiper 32 via a mechanical shaft linkage 44. The output of the amplifier 42 is nulled by the motor 43 positioning a wiper 45 on a grounded, electrically energized potentiometer 46 for picking off a nulling signal which is fed back to the input of the amplifier 42. When the feedback signal to the amplifier 42 is of opposite phase and equal to the signal supplied by the Mach input 27, the output of the amplifier 42 is nulled and the motor 43 is stopped.

For example, for a given command vertical speed and a high Mach number, the attitude of the aircraft need not be as steep as would be required for lower Mach numbers. Accordingly, the angle of attack of the aircraft must be increased if the aircraft is climbing at a reduced Mach number at the given command vertical speed. Thus, if the actual vertical speed of the aircraft is too low, the needle 11 will be below center. Therefore, for the given command vertical speed, the Mach number of the aircraft will have to be increased, e.g. by increasing power, so as to increase the actual vertical speed of the aircraft.

Alternatively, the command speed of the aircraft can be reduced and thereby cause the needle 11 to center at the instantaneous Mach number and actual vertical speed without changing the control stick position.

On moving the stick 17, the sum of a momentary voltage signal proportional to the stick position and a voltage proportional to the actual vertical speed of the aircraft from the vertical speed input 26 are also fed into the cross pointer 10 via a demodulator 49 in opposition to the signal picked off from the wiper 32 for centering the needle 11. The demodulator 49 serves the function of picking off a significant signal from the carrier signal.

Specifically, a secondary winding or output 50 of a stick feedback linear transformer 51 is positioned by the stick 17 and the voltage impressed therein from an electrically energized primary or input winding 52 is fed to the input side of a stick washout amplifier 53. The output of the amplifier 53 energizes the variable phase of a motor 54. The motor 54, through a rated gear train 55 and a shaft arrangement 56, repositions the primary or input winding 52 of the linear transformer 51 and thus quickly washes out the stick position voltage. The stick position feedback voltage is for the purpose of quickening the command display in indicator 10 to the pilot. Accordingly, the pilot does not have to wait for the aircraft to respond to a change in stick position, but can determine immediately, from the very fast needle sweep direction, that the stick 17 is being correctly moved to cancel the command and thereby to ultimately center the needle 11 once the aircraft attitude is changed responsive to the control stick positioning. It will be noted that the pilot is apprised of the effect of a stick position generally before the aircraft will respond to a change in control surface position.

The wiper 39 of the command potentiometer 35 is not normally affected by the command signal being canceled, at least while the differential altitude is greater than 1000 to 5000 feet, because a washout clutch 76 is normally open. In order to bring the aircraft to a command altitude via an asymptotic approach path, at approximately the last minute, the following apparatus is put into circuit with the command potentiometer 35 by engaging the washout clutch 76.

When the altitude command knob 20 is positioned, a rotor 60 of an altitude command synchro 61 is rotated to a position with respect to a stator 62, corresponding to the command altitude shown on the counter 30. The movement of the rotor 60 results in a signal being induced into the stator coil 62 proportional to the command altitude via a rotor coil 63 energized from a standard power supply.

The stator 62 of the command synchro 61 is connected back-to-back to a stator winding 64 of an altitude synchro 65 via a set of three normally closed contacts 66a, 66b, 66c, operated by a mechanically held altitude relay 66. The stator 64 is adapted to be adjusted preferably by a servomechanism of the altitude input 25 that operates as a function of the actual aircraft altitude.

The output signal in an output rotor coil 68 from the stator 64 of the altitude synchro, is proportional, then, to the difference between the commanded altitude and the instantaneous actual aircraft altitude. When a relay contact 69 is closed in a manner to be described, the output signal is fed into a differential altitude amplifier 70. The output of the amplifier 70 excites the variable phase of a motor 71; and whenever the actual and commanded altitudes are not identical, the motor 71 will accordingly angularly reposition an altitude synchro rotor 72 by an amount proportional to the differential altitude via a shaft arrangement 74 having a normally closed solenoid-operated clutch 75.

Moreover, the motor 71 repositions the wiper 39 of the command potentiometer 35 respectively via the shaft 74, the washout clutch 76, and a command differential 77 so that the command vertical speed to the indicator 10 is washed out at a rate proportional to the aircraft rate of approach to the command altitude. The washout rate is obtained because of the constant repositioning of the altitude synchro rotor 72 by the differential altitude motor 71 to balance rotation of the stator 64 which is being constantly repositioned as a function of the aircraft altitude. As the command is washed out, the stick 17 is repositioned to keep the needle 11 centered. If the needle 11 is kept centered as the control stick 17 is repositioned or the vertical speed is reduced as a function of the differential altitude, the aircraft will make an asymptotic approach to the command altitude.

The normally closed clutch 75 and the normally open clutch 76 are solenoid operated by a washout microswitch 80 linearly positioned on a pair of parallel rails 81 as a function of the position of the vertical speed command knob 21. A servomechanical linkage 82 connects the knob 21 with the switch 80 for positioning the latter on the rails 81 relative of a rotatable, but otherwise fixed, washout cam 84.

The switch 80 is closed when a wheeled follower-type microswitch trigger 83 rides up on a lobe 84a of a washout trigger cam 84, as shown in FIG. 3, and is opened when the trigger 83 is biased towards and rides upon the base circle 84b of the cam 84.

An output shaft 85 of an altitude mechanical differential 86 positions the washout trigger cam 84. The output shaft 85 of the altitude differential 86 is driven by the shafts 87, 67, which respectively position the command synchro rotor 60 and the altitude synchro stator 64.

In particular, the washout trigger cam lobe 84a at the widest or upper end thereof is preferably raised to be proportional to 5000 feet of differential altitude and tapers off towards the opposite end until the narrowest portion of the lobe 84a is proportional to 1000 feet of differential altitude. At low vertical speeds, such as, for example, 2000 f.p.m. the wheel of cam follower 83 would ride upon the narrowest portion of the cam lobe so that at 1000 f.p.m. it would take two minutes for the aircraft to reach command altitude during the asymptotic approach.

As the aircraft climbs to within 5000 feet of the commanded altitude of 50,000 feet, in accordance with the example, the follower 83 will ride up on the raised, wider 5000 feet rated portion of the cam 85 and accordingly close the contacts of the washout switch 80 and engage the washout clutch 76 via relay solenoid 90 and solenoid 91, respectively. Then, since the rotor 72 driven by the motor 71 steadily washes out the differential signal to the amplifier 70, the aircraft will make an asymptotic approach to the command altitude after the aircraft climbs or dives within 5000 feet of the command altitude at the commanded vertical speed of 5000 f.p.m. Thus, the asymptotic approach to command altitude takes one minute if the command is properly executed.

Insofar as the above structure has been disclosed, whenever the pilot fails to set in the command altitude with the knob 20, and either the dive button 24 or the climb button 23 is pressed, the pilot of the aircraft will be commanded, via the display to climb or dive until a command altitude is inserted or the altitude hold button 22 is pressed. The reason for this is that the command linear transformer primary winding 37 is energized by the closing of the switch 38.

In order to eliminate the necessity for pressing the climb or dive buttons when a command altitude is selected, an altitude polarity cam 93, FIG. 3, is adapted to revolve and close a microswitch 94 and reverse the excitation of the vertical speed linear transformer by energizing a mechanically held relay 107 as a function of the positive or negative difference between commanded altitude and actual altitude. The energization of the relay 107 causes its contacts 107a, b to move downwardly and reverse the excitation of the primary winding 37 of the command transformer 34. Both of the cams 84 and 93 are adapted to be revolved at a very slow rate by the output shaft 85 of the differential 86. Less than one complete revolution covers an altitude differential slightly greater than the maximum operational altitude above sea level, for example, 55,000 feet.

Incorporated into the invention is a novel altitude hold apparatus for enabling the pilot to hold a selected altitude by properly centering the needles 11, 12. Operation of the altitude hold button 22 energizes the altitude relay 66 with the closing of a switch 95 and the connecting of the relay coil 66 to a power supply. At the closing of the switch 95, a stator 96 of an altitude hold synchro 97 is put into circuit back-to-back with the stator 64 of the altitude synchro 65. This occurs upon the normally closed relay switches 66a, 66b, 66c, being opened, and the normally open relay switches 66d, 66e, 66f being closed when the relay coil 66 is energized.

At the same time, a solenoid-operated clutch 98 is disengaged, a solenoid-operated clutch 102 is engaged, a The clutches 98 and 100 are operated by a solenoid 105. For approximately 0.1 second of time governed by a time delay relay 101, the solenoid operated clutch 75 is disengaged, a solenoid-operated clutch 102 is engaged, a solenoid-operated clutch 103 is disengaged, and a switch 104 is closed by the closing of a switch 106 operated by the enregizing of the relay 101. The clutches 75, 102 and the switch 104 are operated by the energization of a relay 108. The switch 104 connects the relay 108 into the line controlled by the washout switch 80 and accordingly is held closed if the switch 80 is closed.

As a result of the closing of either of the switches 106 or 104, the differential altitude motor 71 will reposition a rotor 110 and a coil 111 of the altitude hold synchro via shaft arrangement 74 so that the relation between the stator 96 and the rotor 110 is identical to the position of the stator 64 and the rotor 72 of the altitude synchro 65.

In effect, now, the altitude hold synchro 97 serves the same function, in the circuit, as did the command synchro 61 previously. After the 0.1 second has elapsed, the clutch 103 is again engaged and switch 106 is opened. As a matter of preference, the altitude hold button 22 is held engaged by means of an energized solenoid 114 in a known manner.

Since the aircraft is at the command altitude when the hold button 22 is pressed, the washout switch 80 and the polarity switch 94 are closed. Accordingly, the relay contact 69 is closed and the washout clutch 76 is engaged so that the wiper 39 is positioned in the manner described should the aircraft depart from the command hold altitude. However, if the aircraft should deviate from the command altitude a sufficient distance to permit the switch 80 to open, the pilot will have to insert the command altitude via knob 20 or climb or dive back to the command altitude as the switch 104 will open upon the coil 108 being deenergized.

When the aircraft is operated in such a manner as to exceed the computed allowable load limit, which includes the safety factor band of 0.25 g., which has been arbitrarily selected, the wiper 39 of the command potentiometer 35 is manipulated in the same general manner as pointed out in connection with the command altitude apparatus for reducing the command signal to the indicator 10.

Specifically, the command differential 77 is provided with a shaft input 115 which transmits a signal from the output of a V-n differential 114 which is operated in the following manner.

A voltage signal proportional to the computed maximum allowable load factor is transmitted to the input of a summing amplifier 116 from a V-n computer 29; and a voltage signal proportional to the actual instantaneous load factor of the aircraft is transmitted to the input of the amplifier 116 from the normal accelerometer 28, the latter signal having a phase opposite to the former signal from the V-n computer 29. The output of the amplifier 116 has a phase similar to the signal from the V-n computer unless the signal from the accelerometer 28 has a magnitude greater than the signal from the computer 29, which is not supposed to be permitted to occur.

A motor 117 is driven by the output signal of the amplifier 116 and via a shaft 119 positions a V-n limit cam 118 relative to a cam follower 120. The output of the amplifier 116 is nulled when the shaft 119 positions a wiper 121 on an electrically energized potentiometer 122 and causes a nulling signal to be picked off and fed back to the amplifier in opposition to the sum of the signals from the computer 29 and the accelerometer 28.

The cam follower 120, through a mechanical linkage 123, angularly positions a V-n sector gear about a pivot axis 124. Movement of the sector gear 123 drives a pinion 125 fixed to a shaft means 126. Angular movement of the pinion 125 operates as one of the inputs to the differential 114 and the pinion 125 is connected therewith via the shaft means 126.

If during the maneuver the aircraft load factor becomes equal to the computed load factor, the V-n limit cam will be positioned, as shown in FIG. 3, so that the cam follower 120 rises and angularly displaces the sector gear 123 and turns the pinion 125, which drives through the washout differential 77 to reduce the command signal at a rate proportional to the rate of penetration of the airplane load factor into the 0.25 g. band of the computed load factor.

Since the aircraft could exceed the V-n limits as a function of reducing vertical speed at too great a rate, which occurs as the command signal is being washed out when the airplane is within 1000 to 5000 feet of the command altitude depending upon the relative position of the follower 83 to the washout cam 84, it could be necessary to increase rather than reduce the command signal.

This is accomplished by using a gear 128 having a diameter preferably less than the diameter of the pinion 125 which drives the gear 128 in an opposite direction. Both of the gears 125 and 128 drive through the differential 114, the gear 125 directly, and the gear 128 through a clutch 129 which is engaged only when the washout switch 80 is closed. The closing of the microswitch 80 causes a solenoid coil 130 to be energized and accordingly the clutch 129 is engaged. This arrangement will reduce the command signal if the V-*n* limits of the aircraft are being exceeded in going into the maneuver and will increase the command signal if the V-*n* limits are exceeded when the aircraft is coming out of the maneuver. In other words, the pinion 125 operates to reduce the command signal at the command potentiometer 35 so long as the clutch 129 is engaged.

When the aircraft is going into or coming out of the maneuver, the command signal is being washed out at an increasing rate. Therefore, in order to minimize the g. load forces during pull out and/or leveling off, it is desirable to increase the command signal being rapidly washed out at the command potentiometer 35 by closing the clutch 129.

The pilot is warned by the blinking of a panel light 200 when the command is being modified by the V-*n* monitor unit. A cam 201 is driven by the V-*n* linkage 115 via a shaft means 202 and causes a tripper 203 of a microswitch 204 to intermittently close a circuit between a voltage source and the light 200, which is grounded.

Horizontal Flight Track

To provide quickening when maneuvering the aircraft to a commanded course heading, signals proportional to aircraft heading change and bank angle, corresponding to heading rate of change, are presented to the pilot in the form of a visual error display by the relative position of the vertical needle 12 relative to a center reference index in the indicator 10, FIG. 4. The pilot has the task of positioning the ailerons in a manner that corresponds to the error shown on the pointer indicator 10. The pilot must carry out this task in response to command and feedback signals imposed on the visual error indicator 10. The pilot can accomplish the task by simply behaving as an amplifier, amplification being considered the easiest analog operation for a pilot to perform.

Referring to FIG. 4, the horizontal flight track monitor apparatus comprises the vertically extending needle 12 of the indicator 10 adapted to move to the left and the right of a center position when the control stick 17 is moved too far to the left or right, respectively, as the aircraft is being maneuvered into a commanded heading at a selected bank/heading ratio. The commanded heading is set-in by means of a manually controlled knob 150 and the bank/heading ratio is established with a knob 151.

Operation of the knob 150 positions a command synchro rotor 152 and a grounded rotor input coil 153 which is energized by a voltage proportional to the selected bank/heading ratio obtained by turning the knob 151 and positioning a wiper 154 on an electrically energized potentiometer 155 via a mechanical linkage 156. The bank/heading ratio can be adjusted to cover a ratio range from 4:1 down to 1:1.

The aircraft heading signal is supplied from a conventional source 158, and a rotor 159 of a heading synchro 160 is positioned thereby via a servomechanical linkage 161 so as to reflect the aircraft heading.

The heading synchro 160 has a stator 162 connected back-to-back with a stator 163 of a command synchro 164, and the voltage signal induced in a rotor or output coil 165 of the heading synchro 160 is proportional to the difference, in degrees, of a heading error between the command synchro 164 and the heading synchro 160. The signal from the heading synchro coil 165 is then fed to a grounded V-*n* monitor potentiometer 166 for energizing the latter.

If during a turn, the maximum allowable load limit is penetrated, according to the V-*n* envelope minus 0.25 g., a cam follower 170 will rise on a V-*n* limit cam 171, mounted side-by-side with the similar V-*n* limit cam 118, and thus turn a V-*n* sector gear 172 about a pivot pin 173. The movement of the sector gear 172 drives a pinion 174 and positions a wiper 175 on the potentiometer 166 via a mechanical linkage 176 onto which the pinion 174 is fixed. The means for positioning the cam 171 is similar to the means required to position the cam 118. As the follower 170 rises on the cam 171, the command signal to the indicator 10 will be reduced to zero at a rate proportional to the penetration of the load factor into the 0.25 g. band of the V-*n* envelope.

The wiper voltage of the V-*n* potentiometer monitor 166 will always reflect the full command heading voltage unless reduced because of V-*n* monitoring. A warning light arrangement can be provided similar to the one described in FIG. 3 to show when V-*n* monitoring occurs. The wiper voltage is then fed to a summing point 177.

A voltage signal proportional to the bank angle of the aircraft is obtained from a conventional unit 178 and is algebraically summed at a summing point 180 with a voltage signal which is proportional to the displacement of the control stick 17. The voltage signal is proportional to the displacement of the control stick 17 by an arrangement similar to the arrangement in FIG. 3. The arrangement comprises a stick position linear transformer 181 having a rotor 182, a rotor or input coil 183 electrically energized from a standard power source, a grounded output coil 184 connected as an input to a stick position washout amplifier 185 and as an input to the summing point 180. In addition, the transformer 181 has a washout rotor 186 angularly positioned by a motor 187 driven by the output of the amplifier 185 for slowly washing out, via a mechanical linkage 189, the rotor voltage signal.

This arrangement quickens the indicator display to the pilot in that as soon as the stick 17 is laterally moved for positioning the ailerons, the relative motion of the cross pointer indicator needle 12 indicates whether the stick 17 is being moved in the proper direction to cancel the command.

The output of the washout amplifier 185 is nulled by the motor 187 causing a wiper 188 of an electrically energized potentiometer 190, via the linkage 189, to pick off a nulling voltage and feed back the nulling voltage to the input of the amplifier 185.

The sum of the stick position and the bank angle voltages are fed to a grounded Mach monitor potentiometer 191. A wiper 192 of the potentiometer 191 is servomechanized as a function of Mach number so that at high Mach numbers the bank/heading ratio is effectively increased. This is accomplished by connecting the wiper to the mechanical linkage 44 of the Mach monitor unit described in FIG. 3.

The voltage signal picked off by the wiper 192 is fed to the summing point 177, FIG. 4, as is the command voltage signal from the wiper 175 of the V-*n* monitor potentiometer and thence to the indicator 10 via a grounded indicator gain adjustment potentiometer 193, its wiper 194, and a demodulator 195. The wiper 194 is adjusted by a knob 196 through linkage means 197.

Vertical and Horizontal Flight Track

As pointed out in the copending application, the aircraft selected for purposes of illustrating the invention has maximum allowable load limits of −3.0 g. and +7.33 g. FIG. 5 is a schematic electromechanical diagram showing the mechanization for limiting these values of maximum allowable negative and positive load limits and showing how this mechanization is incorporated into the mechanization for the vertical and horizontal flight track phases of the invention.

When the normal acceleration of the aircraft is within 0.25 g. band of the extreme load limits, the command signal to the cross pointer indicator 10 will be reduced by an amount proportional to the penetration of the aircraft load factor into the 0.25 g. band tolerance.

Taking, for example, the FIG. 3 mechanization of the vertical flight track phase, the wiper 32 of the Mach monitor potentiometer 33 is positioned so that the command signal voltage to the indicator 10 is reduced.

More particularly, a voltage signal characterizing the actual instantaneous normal acceleration of the aircraft is picked off from a normal accelerometer unit 209 and fed to the input of an amplifier 210. The output of the amplifier 210 drives a motor 211, which angularly positions a maximum allowable acceleration limit cam 212 via a mechanical shaft linkage 213. The motor will stop turning when the linkage 213 has positioned a wiper 214 of an acceleration feedback potentiometer 215 so that an equal and opposite voltage signal is fed back to the input of the amplifier 210 for nulling the output thereof. The potentiometer 215 is suitably electrically energized.

The motor shaft linkage 213 has a definite angular position for each position of a wiper 217 on a grounded electrically energized accelerometer potentiometer 218 of the normal accelerometer 209.

The wiper 217 of the accelerometer 209 is moved by the vertical displacement of a mass 220 suspended by a coil spring 221 from a portion of the aircraft's airframe 222. When the mass 220 moves downwardly, the aircraft is undergoing positive normal acceleration. When the mass 220 moves upwardly, the aircraft is undergoing a negative normal acceleration. Accordingly, the greater the absolute value of the negative normal acceleration of the aircraft, the smaller the voltage signal picked off by the wiper 217. Conversely, the greater the absolute value of the positive normal acceleration of the aircraft, the greater the voltage signal picked off by the wiper 217. The phase of the signal picked off by the wiper 217 will always be of the same magnitude and opposite in phase to the nulling signal picked off by the wiper 214.

The shaft linkage 213 angularly positions the acceleration limit cam 212 so that when the normal acceleration of the aircraft is equal to either +7.33 g.—0.25 or —3.0+0.25 g., a cam follower 216 is at the start of the cam rise 212a. As the load factor on the aircraft increases either positively or negatively, the command voltage to the cross pointer indicator 10 will be reduced, since the follower will rise up on the cam surfaces 212b or 212c, respectively.

It is understood that the present invention may be modified to adapt it to various circumstances and conditions in various aircraft, and it is accordingly desired to comprehend within the purview of this invention such modifications as are considered to come within the scope of the appended claims.

What is claimed is:

1. A command limiter for an aircraft having a control stick and comprising, means for monitoring the dynamic condition of the aircraft and transmitting a first signal proportional to the dynamic condition of the aircraft, means for generating and transmitting a second signal representative of an aircraft maneuver to be executed, visual display means including an indicator movable relative to an index, said first and second signals being transmitted to said visual display means in opposition to each other and causing said visual display means to indicate any difference between said first and second signals representative of the pilot error in executing the command maneuver, and quickened display means including means for monitoring the control stick positioning and incrementally altering said first signal for providing a quickened display of the effect of the control stick positioning on the dynamic condition of the aircraft.

2. A command limiter for an aircraft having a control stick and comprising, means for monitoring the dynamic condition of the aircraft, means for generating and transmitting a second signal representative of an aircraft maneuver to be executed, visual display means including an indicator movable relative to an index, said first and second signals being transmitted to said visual display means in opposition to each other and causing said visual display means to indicate any difference between said first and second signals representative of the pilot error in executing the command maneuver, quickened display means including means for monitoring the control stick positioning and incrementally altering said first signal for providing a quickened display of the effect of the control stick positioning on the dynamic condition of the aircraft, and means for moving said second signal ahead before transmitting the same to said visual display means for providing command translation by reducing the lag between the aircraft dynamic condition relative to the command maneuver.

3. A command limiter for an aircraft having a control stick and comprising, means for monitoring the dynamic condition of the aircraft and transmitting a first signal proportional to the dynamic condition of the aircraft, means for generating and transmitting a second signal representative of an aircraft maneuver to be executed, visual display means including an indicator movable relative to an index, said first and second signals being transmitted to said visual display means in opposition to each other and causing said visual display means to indicate any difference between said first and second signals representative of the pilot error in executing the command maneuver, quickened display means including means for monitoring the control stick positioning and incrementally altering said first signal for providing a quickened display of the effect of the control stick positioning on the dynamic condition of the aircraft, and means for monitoring the normal acceleration of the aircraft and modifying said second signal so as to maintain the magnitude of said second signal within the maximum allowable load limit capability of the aircraft.

4. A command limiter for an aircraft having a control stick and comprising, visual display means having an indicator movable relative to an index, stick feedback linear transformer means including an electrically energized primary winding and a secondary winding with a rotor adapted to be positioned by the control stick, a first signal generated proportional to a repositioning of said secondary winding rotor by movement of the control stick, rotor means adapted to reposition said primary winding and wash out said first signal after a predetermined period of time, means for providing a second signal proportional to the vertical speed of the aircraft, means for summing said first and second signals, means for rectifying said sum of said first and second signals and transmitting said rectified sum to said visual display means, means providing a third signal proportional to a command vertical speed, means for rectifying said third signal, means for modifying said rectified third signal as a function of the aircraft Mach number and transmitting said modified third signal to said visual display means in opposition to said rectified sum of said first and second signals, and said visual display means indicating the error between said opposed signals which is proportional to the error in executing the command.

5. A command limiter for an aircraft having a control stick and comprising, visual display means having an indicator movable relative to an index, stick feedback linear transformer means including an electrically energized primary winding and a secondary winding with a rotor adapted to be positioned by the control stick, a first signal generated proportional to a repositioning of said secondary winding rotor by movement of the control stick, rotor means adapted to reposition said primary winding and wash out said first signal after a predetermined period of time, means for providing a second signal proportional to the vertical speed of the aircraft, means for summing said first and second signals and transmitting said sum to said visual display means, means providing a third signal proportional to a command vertical speed, means for modifying said third signal as a function of the aircraft Mach number and transmitting said modified third signal to said visual display means in opposition to said sum of said first and second signals, and said visual display means indicating the error between said opposed signals which is proportional to the error in executing the command.

6. A command limiter for an aircraft having a control stick and comprising, visual display means having an indicator movable relative to an index, stick feedback linear transformer means including an electrically energized primary winding and a secondary winding with a rotor adapted to be positioned by the control stick, a first signal generated proportional to a repositioning of said secondary winding rotor by movement of the control stick, rotor means adapted to reposition said primary winding and wash out said first signal after a predetermined period of time, means for providing a second signal proportional to the vertical speed of the aircraft, means for summing said first and second signals and transmitting said sum to said visual display means, means providing a third signal proportional to a command vertical speed, means for modifying said third signal as a function of the aircraft Mach number and transmitting said modified third signal to said visual display means in opposition to said sum of said first and second signals, said visual display means indicating the error between said opposed signals which is proportional to the error in executing the command, and means for washing out said third signal in such a manner as to command the aircraft to be piloted to a command altitude via an asymptotic approach path.

7. A command limiter for an aircraft having a control stick and comprising, visual display means having an indicator movable relative to an index, stick feedback linear transformer means including an electrically energized primary winding and a secondary winding with a rotor adapted to be positioned by the control stick, a first signal generated proportional to a repositioning of said secondary winding rotor by movement of the control stick, rotor means adapted to reposition said primary winding and wash out said first signal after a predetermined period of time, means for providing a second signal proportional to the vertical speed of the aircraft, means for summing said first and second signals and transmitting said sum to said visual display means, means providing a third signal proportional to a command vertical speed, means for modifying said third signal as a function of the aircraft Mach number and transmitting said modified third signal to said visual display means in opposition to said sum of said first and second signals, said visual display means indicating the error between said opposed signals and thereby indicating the error in executing the command, and means for washing out said third signal in such a manner as to command the aircraft to be piloted to a command altitude via an asymptotic approach path when the aircraft is within a predetermined distance of said command altitude.

8. A command limiter for an aircraft having a control stick and comprising, visual display means having an indicator movable relative to an index, stick feedback linear transformer means including an electrically energized primary winding and a secondary winding with a rotor adapted to be positioned by the control stick, a first signal generated proportional to a repositioning of said secondary winding rotor by movement of the control stick, rotor means adapted to reposition said primary winding and wash out said first signal after a predetermined period of time, means for providing a second signal proportional to the vertical speed of the aircraft, means for summing said first and second signals and transmitting said sum to said visual display means, means providing a third signal proportional to a command vertical speed, means for modifying said third signals as a function of the aircraft Mach number and transmitting said modified third signal to said visual display means in opposition to said sum of said first and second signals, said visual display means indicating the error between said opposed signals and thereby indicating the error in executing the command, and means for monitoring the normal acceleration of the aircraft and modifying said third signal so as to maintain the magnitude of said third signal within the maximum allowable load limit capability of the aircraft.

9. A command limiter for an aircraft having a control stick and comprising, means for monitoring the dynamic condition of the aircraft and transmitting a first signal proportional to the dynamic condition of the aircraft, means for generating and transmitting a command signal proportional to a product of the bank to heading ratio and the difference between the actual aircraft heading and a command heading, visual display means including an indicator movable relative to an index, said first and second signals being transmitted to said visual display means in opposition to each other and causing said visual means to indicate any difference between said first and second signals representative of the pilot error in executing the command maneuver, and quickened display means including means for monitoring the control stick positioning and incrementally altering said first signal for providing a quickened display of the effect of the control stick positioning on the dynamic condition of the aircraft.

10. A command limiter as set forth in claim 9, wherein said first signal is proportional to a product of a signal proportional to the instantaneous Mach number of the aircraft and a signal proportional to the sum of a signal proportional to the instantaneous roll rate of the aircraft and a signal proportional to the change in position of the control stick.

11. A command limiter for an aircraft comprising, visual display means including an indicator movable relative to an index, means for monitoring the dynamic condition of the aircraft and transmitting a first signal proportional to the dynamic aircraft condition to said visual display means, and means for generating and transmitting a second signal representative of a command maneuver to be performed by the aircraft to said visual display means in opposition to said first signal, said movable indicator being moved relative to said index and indicating the pilot error in carrying out the commanded maneuver, and means for monitoring the normal acceleration of the aircraft and modifying said second signal so as to maintain the magnitude of said second signal within the maximum allowable load limit capability of the aircraft.

12. A command limiter as set forth in claim 11, wherein said monitoring means comprises, amplifier means, a motor driven by the output of said amplifier means, a third signal proportional to the maximum allowable load limit of the aircraft at the instantaneous dynamic condition thereof and connected as an input to said amplifier means, a fourth signal proportional to the instantaneous normal acceleration of the aircraft connected as an input to said amplifier means and in opposition to said third signal, the output of said amplifier means being proportional to the difference in magnitude of said third and fourth signals, means driven by said motor and adapted to modify said second signal and prevent the said second signal from commanding the aircraft to be piloted in such a manner as to exceed the maximum allowable load limit to the aircraft, means driven by said motor for generating and transmitting a nulling signal to said amplifier means and nulling the output thereof and stopping the motor.

13. A command limiter for an aircraft comprising, visual display means including an indicator movable relative to an index, means for monitoring the dynamic condition of the aircraft and transmitting a first signal proportional to the dynamic aircraft condition to said visual display means, means for generating and transmitting a second signal representative of a command maneuver to be performed by the aircraft, said movable indicator being moved relative to said index and indicating the pilot error in carrying out the commanded maneuver, potentiometer means energized by said second signal, wiper means slidable along said potentiometer means and picking off a third signal, means transmitting said third signal to said visual display means in opposition to said first signal, normal acceleration means generating a fourth signal proportional to the instantaneous load on the aircraft, amplifier means having said fourth signal fed to the input thereof, a motor driven by the output of said amplifier means, acceleration limit cam means driven by said motor, means driven by said motor for picking off and feeding a nulling signal back to said amplifier means and stopping said motor, and cam follower means adapted to position said wiper means and modify said third signal, and said follower means being positioned by said acceleration limit cam.

14. A command limiter as set forth in claim 13, wherein said acceleration limit cam has a peripheral portion designed so that said third signal will be reduced when the aircraft load factor increases either positively or negatively.

References Cited in the file of this patent

UNITED STATES PATENTS

| | | |
|---|---|---|
| 1,794,690 | Horni | Mar. 3, 1931 |
| 2,538,303 | Findley | Jan. 16, 1951 |
| 2,796,594 | Chombard | June 18, 1957 |
| 2,810,119 | Brown | Oct. 15, 1957 |
| 2,821,695 | Strock | Jan. 28, 1958 |

FOREIGN PATENTS

| | | |
|---|---|---|
| 156,477 | Australia | May 14, 1954 |
| 745,389 | Great Britain | Feb. 22, 1956 |